(12) United States Patent
Mombers

(10) Patent No.: US 12,197,361 B2
(45) Date of Patent: Jan. 14, 2025

(54) TENSOR TRANSFER THROUGH INTERLEAVED DATA TRANSACTIONS

(71) Applicant: Avago Technologies International Sales Pte. Limited., Singapore (SG)

(72) Inventor: Friederich Mombers, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 17/876,380

(22) Filed: Jul. 28, 2022

(65) Prior Publication Data
US 2024/0037046 A1    Feb. 1, 2024

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS

| | | | | |
|---|---|---|---|---|
| 11,797,473 | B2 * | 10/2023 | Shippy | G06F 17/142 |
| 2018/0052806 | A1 * | 2/2018 | Hastings | G06N 10/00 |
| 2019/0042677 | A1 * | 2/2019 | Matsuura | G06N 10/00 |
| 2019/0042974 | A1 * | 2/2019 | Daraeizadeh | G06N 7/01 |
| 2019/0065188 | A1 * | 2/2019 | Shippy | G06F 9/3877 |
| 2019/0206090 | A1 * | 7/2019 | Ray | G06T 15/005 |
| 2020/0104275 | A1 * | 4/2020 | Sen | G06F 9/544 |
| 2020/0104691 | A1 | 4/2020 | Bai et al. | |
| 2020/0192417 | A1 * | 6/2020 | Fernandes Ramos | H03L 7/08 |
| 2021/0092069 | A1 * | 3/2021 | Musleh | H04L 47/2441 |
| 2021/0200439 | A1 | 7/2021 | Ruan et al. | |
| 2021/0398621 | A1 * | 12/2021 | Stojevic | G16C 20/30 |
| 2022/0326757 | A1 * | 10/2022 | Sydir | H04W 52/0216 |
| 2023/0017662 | A1 * | 1/2023 | Kadri | G06N 3/0464 |
| 2023/0206104 | A1 * | 6/2023 | Rab | G06N 10/40 |
| | | | | 716/100 |

OTHER PUBLICATIONS

Extended European Search Report, European Application No. 23182020. 0, Nov. 2, 2023.

* cited by examiner

*Primary Examiner* — Henry Tsai
*Assistant Examiner* — Christopher A Bartels

(57) ABSTRACT

A device includes a direct memory access (DMA) controller comprising DMA channels, a bridge circuit configured to couple the DMA channels to memory channels coupled to respective memory modules, and a local memory unit. The DMA controller is configured to transfer tensor data between the local memory unit and the memory modules via the DMA channels and the memory channels using concurrent data transactions, the tensor data is stored and addressed as parts of a single tensor in the local memory unit, and the tensor data is interleaved onto the memory modules and is stored and addressed as sub-tensors in respective memory modules.

20 Claims, 3 Drawing Sheets

TENSOR TRANSFER THROUGH INTERLEAVED DATA TRANSACTIONS

TECHNICAL FIELD

The present description relates generally to hardware acceleration including, for example, hardware acceleration for machine learning operations.

BACKGROUND

Machine learning operations performed in layers of a machine learning model are good candidates for hardware acceleration. A machine learning engine of a hardware accelerator may be configured to perform operations on tensor data stored in a local memory. As the hardware accelerator is used for multiple machine learning operations, the tensor data stored in the local memory may be exchanged with other tensor data stored in an external memory coupled to the hardware accelerator.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

A machine learning engine of a hardware accelerator may be configured to perform operations on one or more tensors stored in a local memory. Tensors may be single-dimensional or multidimensional arrays of elements. For example, a tensor may be visualized as a three-dimensional array of elements, where each element of the array has a corresponding value. The elements or tensor data may include features, weights, activations, etc. processed in different layers of a machine learning model. Operations may require the hardware accelerator to exchange the tensor data stored in the local memory with other tensor data stored in an external memory coupled to the hardware accelerator. Tensors having large amounts of tensor data and/or frequent machine learning operations may strain the bandwidth of the memory channel to the external memory.

The subject technology provides an efficient system for transferring tensor data between local memory of a machine learning hardware accelerator and external memory. According to aspects of the subject technology, a hardware accelerator may be configured to interleave tensors on multiple external memory modules, where each memory module is coupled to the hardware accelerator via a respective independent memory channel. Tensor data may be transferred between the local memory and the external memory modules using concurrent data transactions via the independent memory channels. In this manner, a tensor may be split into multiple sub-tensors each containing a respective portion of the data of the tensor and stored on respective external memory modules. The bandwidth used to transfer the tensor then may be divided among the multiple memory channels to increase the speed with which the tensor is transferred. Other aspects and features of the subject technology are described below.

Figure 1:
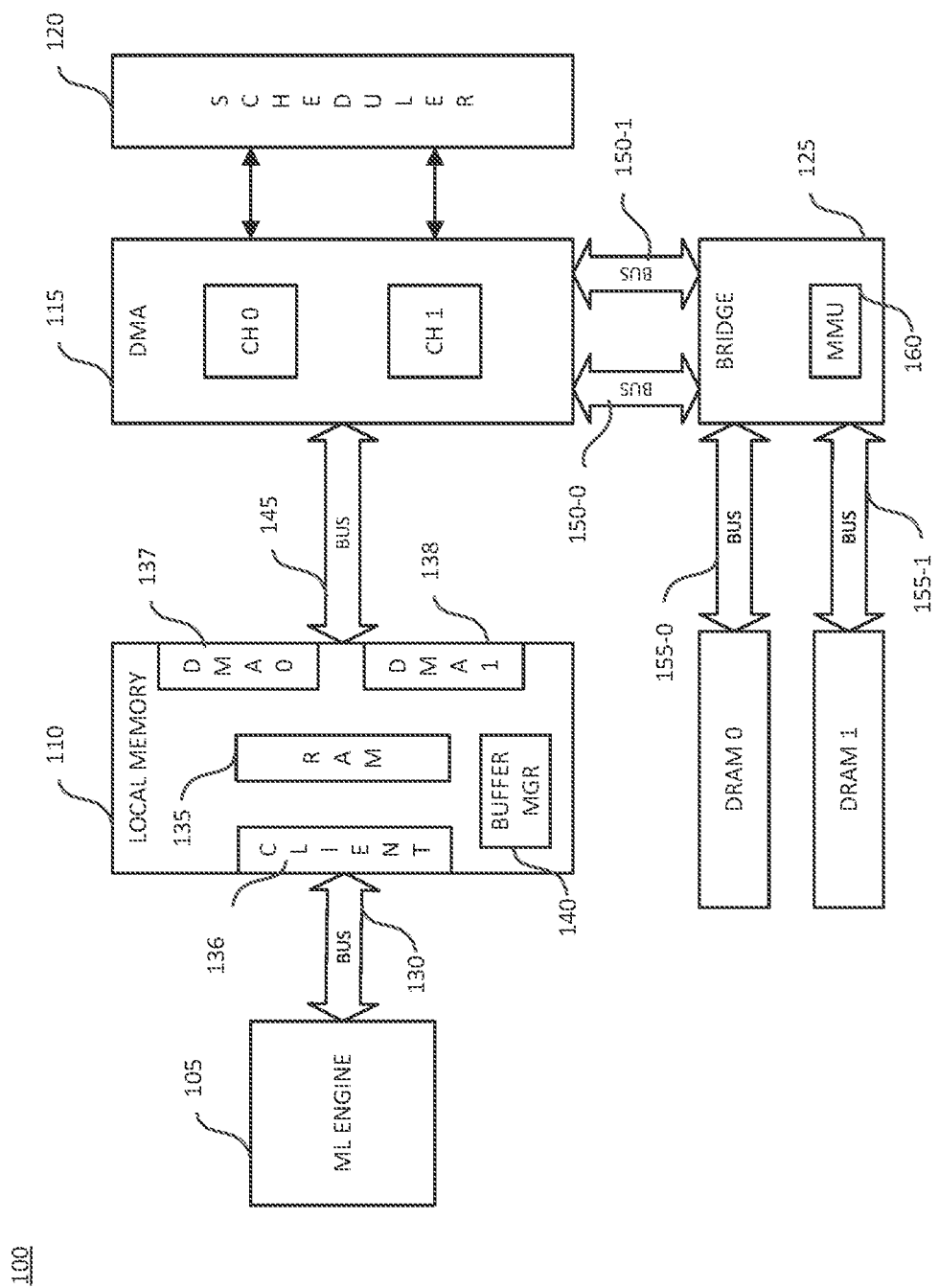
FIG. 1 is a block diagram depicting components of a machine-learning hardware accelerator device according to aspects of the subject technology.

FIG. 1 is a block diagram depicting components of a machine learning hardware accelerator device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 1, hardware accelerator device 100 includes machine learning (ML) engine 105, local memory unit 110, direct memory access (DMA) controller 115, scheduler circuit 120, and bridge circuit 125. The components of hardware accelerator device 100 may be implemented in a single semiconductor device, such as a system on a chip (SoC). Alternatively, one or more of the components of hardware accelerator device 100 may be implemented in a semiconductor device separate from the other components and mounted on a printed circuit board, for example, with the other components to form a system. The subject technology is not limited to these two alternatives and may be implemented using other combinations of chips, devices, packaging, etc. to implement hardware accelerator device 100.

According to aspects of the subject technology, ML engine 105 includes suitable logic, circuitry, and/or code to perform a machine learning operation on tensor data of one or more tensors. The machine learning operations may include activation functions, pooling operations, convolution operations, etc. ML engine 105 may be configured to request and receive tensor data from local memory unit 110. Control signals, commands, tensor data, etc. may be communicated between local memory unit 110 and ML engine 105 via bus 130. Bus 130 includes suitable logic, circuitry, and transmission media (e.g., electrical wires or traces) to facilitate communications between ML engine 105 and local memory unit 110.

According to aspects of the subject technology, local memory unit 110 includes suitable logic, circuitry, and/or code to manage the local storage of data for processing by a processing component of hardware accelerator device 100, such as one or more tensors for machine learning operations performed by ML engine 105. As depicted in FIG. 1, local memory unit 110 includes random-access memory (RAM) 135, client buffer 136, DMA buffer 137, DMA buffer 138, and buffer manager 140. Buffer manager 140 may be configured to set up and manage an internal buffer in RAM 135 for each tensor, or part of a tensor, locally stored for operations performed by ML engine 105. The subject technology is not limited to any particular type of memory or size for RAM 135. For example, RAM 135 may include one or more integrated circuits of static random-access memory, dynamic random-access memory, etc. The size of RAM 135 limits the size and/or number of tensors for which internal buffers can be managed in local memory unit 110 at any given time, which may impact the frequency at which tensor data stored in local memory unit 110 are exchanged for tensor data stored in external memory.

According to aspects of the subject technology, client buffer 136, DMA buffer 137, and DMA buffer 138 may be first-in-first-out buffers configured to facilitate the transfer of tensor data into and out of local memory unit 110. These buffers are not limited to any particular type or size of memory or registers and may be allocated and managed within a common memory integrated circuit or may be implemented using different memory integrated circuits. Client buffer 136 may be arranged in a transfer path for transferring tensor data between ML engine 105 and local memory unit 110 via bus 130. Similarly, DMA buffer 137 and DMA buffer 138 may be arranged in respective transfer paths for transferring data between local memory unit 110 and respective DMA channels of DMA controller 115 via bus 145. Bus 145 includes suitable logic, circuitry, and transmission media (e.g., electrical wires or traces) to facilitate communications of control signals, commands, and/or tensor data between ML engine 105 and local memory unit 110.

Buffer manager 140 may be configured to manage read/write pointers for the internal buffer(s) in RAM 135, client buffer 136, DMA buffer 137, and DMA buffer 138 to control an order of transferring tensor data into and out of local memory unit 110. Buffer manager 140 also may be configured to monitor states of these buffers (e.g., fullness value indicating how much memory space remains or has been used in the buffer) and share the buffer states with the other components involved in transferring tensor data, such as ML engine 105 and DMA controller 115, to control the timing of tensor data transfers between the components.

According to aspects of the subject technology, DMA controller 115 includes suitable logic, circuitry, and/or code to execute data transactions to transfer data from one memory location to another memory location. For example, DMA controller 115 may be configured to execute a data transaction transferring tensor data from external memory to local memory unit 110. As depicted in FIG. 1, DMA controller 115 includes two DMA channels, channel 0 and channel 1. Each DMA channel may include logic, circuitry, and/or code that is configurable to execute a data transaction independent of and concurrent with data transactions being executed on the other DMA channel. Concurrent data transactions may be initiated and/or completed at different times but have one or more operations that occur concurrently. For example, each DMA channel may include a set of registers that may be programmed with parameters for a data transaction such as source memory address, destination memory address, transfer data size, etc. In addition, each DMA channel may manage a respective buffer to facilitate the transfer of data. While two DMA channels are depicted in FIG. 1, the subject technology is not limited to two DMA channels and may be implemented with more than two DMA channels. Aspects of the subject technology may be simpler to implement if the number of DMA channels is a power of two or at least an even number.

According to aspects of the subject technology, scheduler circuit 120 includes suitable logic, circuitry, and/or code to program the DMA channels of DMA controller 115 to execute data transactions to transfer tensor data. Scheduler circuit 120 may be configured to keep track of what tensor data is stored in local memory unit 110 and what tensor data is available in external memory using tables or other data structures. In addition, scheduler circuit 120 may program or instruct ML engine 105 to execute machine learning operations on one or more tensors. Accordingly, schedule circuit 120 may coordinate the transfer of tensor data into or out of local memory 110 using DMA controller 115 to ensure that ML engine 105 has access to tensor data needed for its machine learning operations.

According to aspects of the subject technology, bridge circuit 125 includes suitable logic, circuitry, and/or code to couple the DMA channels of DMA controller 115 with respective memory channels via bus 150-0 and bus 150-1 to facilitate data transactions transferring data into or out of external memory. Buses 150-0 and 150-1 include suitable logic, circuitry, and transmission media (e.g., electrical wires or traces) to facilitate communications of control signals, commands, and/or tensor data between respective DMA channels of DMA controller 115 and bridge circuit 125. While two separate buses are depicted in FIG. 1, the subject technology may be implemented using a single bus shared by the two DMA channels of DMA controller 115.

In the example depicted in FIG. 1, external memory may be dynamic random-access memory (DRAM) and is represented by memory modules DRAM 0 and DRAM 1. The subject technology may be implemented using other types of random-access memory and is not limited to any particular type of memory module or memory size. A memory module may include one or more memory integrated circuits packaged and configured to be coupled to a memory channel. A memory channel may include logic, circuitry, and/or code configured to communicate control signals, addresses, data, etc. between bridge circuit 125 and a memory module such as DRAM 0 or DRAM 1. For example, each memory channel may include a respective bus, such as bus 155-0 or bus 155-1. Buses 155-0 and 155-1 include suitable logic, circuitry, and transmission media (e.g., electrical wires or traces) to facilitate communications of control signals, commands, addresses, and/or tensor data between respective memory modules and bridge circuit 125. The memory channels may be independent allowing data transactions executed via one memory channel to be independent and concurrent with data transactions executed on another memory channel. Concurrent data transactions may be initiated and/or completed at different times but have one or more operations that are executed concurrently. The memory channels may not be symmetric in terms of maximum bandwidth, density, instantaneous available bandwidth, etc., and the timing response on each memory channel may not be directly predictable or synchronized with the other memory channel.

According to aspects of the subject technology, DMA controller 115 may use virtual addresses in a virtual address space to track the locations of tensor data. As part of coupling the DMA channels with respective ones of the memory channels, bridge circuit 125 may be configured to translate a virtual address received from one of the DMA channels into a corresponding physical address on one of the memory modules, and vice versa. Depending on a memory allocation model used for hardware accelerator 100, the translation may involve determining an address offset for a contiguous memory model, or a page-based translation for a page-based memory model. For example, bridge circuit 125 includes memory management unit (MMU) 140 that is configured to index into a page table based on a virtual address for a page of data to look up a page table entry containing the physical address in the memory modules at which the page of data is stored.

According to aspects of the subject technology, the tensor data of tensors operated on by hardware accelerator 100 may be divided into sub-tensors stored on respective memory modules by interleaving the tensors onto the memory modules at a particular granularity. For example, using a 64-byte interleaving granularity, the tensor data of a tensor may be interleaved onto the two memory modules of FIG. 1 in an interleaving pattern comprising alternatingly assigning 64-byte portions of the tensor to respective ones of the memory modules. All of the portions of tensor data assigned to DRAM 0 make up a first sub-tensor that is stored in DRAM 0 and all of the portions of tensor data assigned to DRAM 1 make up a second sub-tensor that is stored in DRAM 1. When the tensor needs to be transferred from external memory to local memory unit 110, the bandwidth of both memory channels is used to read out the two sub-tensors and transfer the sub-tensors to local memory unit 110 via respective DMA channels of DMA controller 115 more quickly than if only a single memory channel were used.

In the example above, a 64-byte interleaving granularity was used to interleave the tensor data of a tensor onto the memory modules. The subject technology is not limited to this size of interleaving granularity and may be implemented using larger or smaller granularities. The size of interleaving granularity may be determined through simulating or testing transfers of tensors for a given hardware accelerator system and external memory modules. For example, a granularity size on the order of the column address strobe (CAS) burst magnitude of the memory modules may provide optimal performance.

According to aspects of the subject technology, the sub-tensors may be associated with a particular DMA channel and the memory channel associated with the particular DMA channel. Data transactions transferring a sub-tensor between the memory modules and local memory unit 110 are performed by the DMA channel and the associated memory channel corresponding to the memory module in which the sub-tensor is stored. For example, DMA channel 0 may be programmed for a data transaction and may execute the data transaction to transfer a first sub-tensor stored in DRAM 0 to DMA buffer 137 of local memory unit 110. DMA channel 1 may be programmed for a data transaction and may execute the data transaction to transfer a second sub-tensor, which together with the first sub-tensor contain the data of a tensor needed by ML engine 105 for processing, stored in DRAM 1 to DMA buffer 138 of local memory unit 110.

According to aspects of the subject technology, buffer manager 140 may be configured to either interleave or de-interleave the tensor data of a tensor based on whether the tensor is being transferred to local memory unit 110 or out of local memory unit 110. Referring to the example above, a first sub-tensor may be received by DMA buffer 137 and a second sub-tensor may be received by DMA buffer 138. Buffer manager 140 may allocate a section of RAM 135 for an internal buffer to store the de-interleaved tensor. Using read/write pointers associated with each of DMA buffer 137, DMA buffer 138, and the internal buffer, buffer manager 140 may be configured to de-interleave the tensor by alternatingly transferring portions of the tensor data from DMA buffer 137 and DMA buffer 138 to the internal buffer in RAM 135. In the internal buffer, the tensor is stored and addressed as a single tensor, which may be a single logical unit with elements of the tensor being individually addressable. ML engine 105 requests tensor data from the tensor using the address space of local memory unit 110 and does not need to reference or even know about the sub-tensors containing the interleaved data stored in respective memory modules.

Figure 2A:
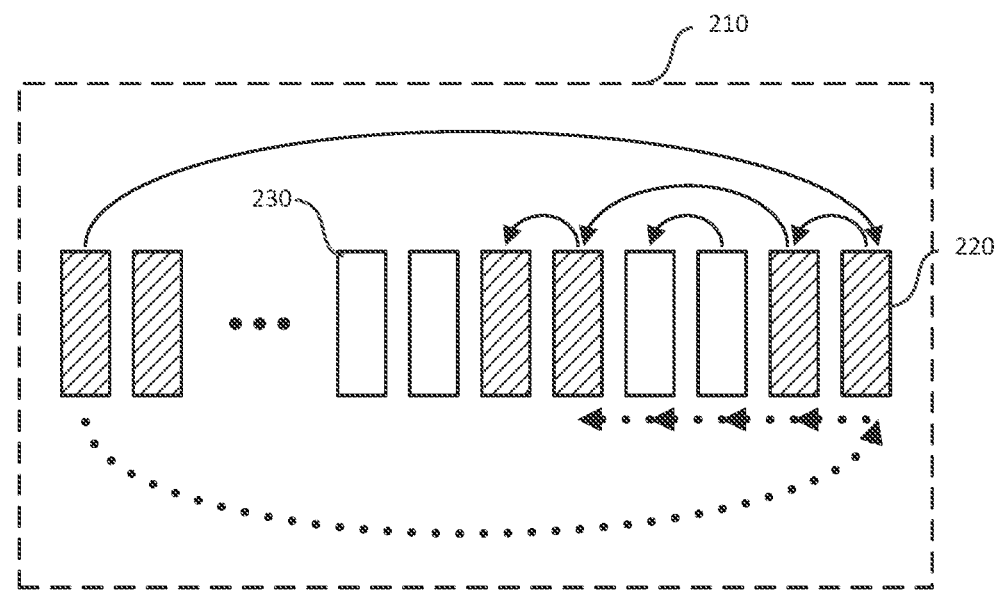
FIG. 2A is a block diagram illustrating a circular first-in-first-out buffer according to aspects of the subject technology.

Buffer manager 140 may create and manage an internal buffer in RAM 135 for each of the tensors used in an operation executed by ML engine 105. The subject technology is not limited to any particular type of buffer and the size of the tensor may control or suggest the type of buffer used. For tensors larger than an available capacity in RAM 135, a circular first-in-first-out (CFIFO) buffer may be used. FIG. 2A is a block diagram illustrating a CFIFO according to aspects of the subject technology.

In FIG. 2A, the hatched blocks 220 represent portions of tensor data interleaved onto one memory module and stored on that memory module as part of a first sub-tensor. Similarly, the unhatched blocks 230 in FIG. 2A represent portions of tensor data interleaved onto the other memory module and stored on that memory module as part of a second sub-tensor. The solid arrows illustrate the progression of a first write pointer indicating where to write the next portion of tensor data from the first sub-tensor and a second write pointer indicating where to write the next portion of tensor data from the second sub-tensor. The dotted arrow illustrates an order of reading out the portions of tensor data when transferring the tensor data to ML engine 105, for example.

The CFIFO buffer can start providing portions of tensor data to ML engine 105 as soon as the first portion or portions of tensor data are written to the CFIFO buffer. DMA controller 115 may receive a fullness value of the CFIFO buffer from buffer manager 140 and be configured to automatically provide more tensor data to the CFIFO buffer as soon as the buffer has room for another DRAM burst from the memory modules. The CFIFO buffer is limited to providing the portions of tensor data to ML engine 105 in the order in which the tensor data is received from the memory modules. However, the CFIFO buffer is able to stream an amount of tensor data that is not limited by the capacity of RAM 135 in local memory unit 110.

Figure 2B:
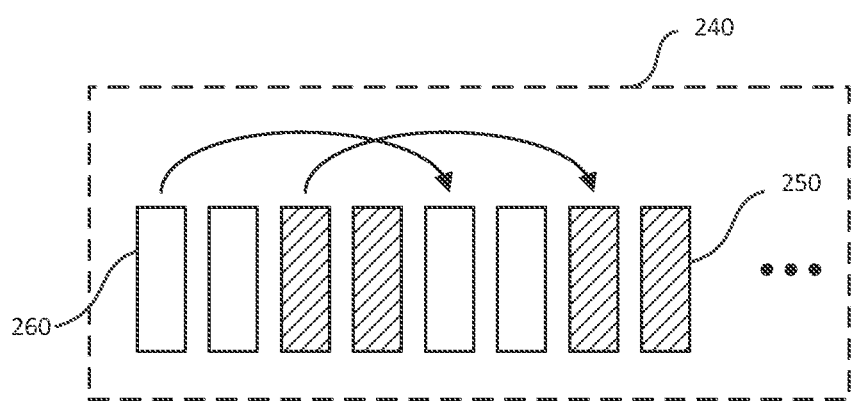
FIG. 2B is a block diagram illustrating a raster first-in-first-out buffer according to aspects of the subject technology.

FIG. 2B is a block diagram illustrating a raster first-in-first-out (RFIFO) buffer according to aspects of the subject technology. Similar to FIG. 2A, the hatched blocks 250 represent portions of tensor data interleaved onto one memory module and stored on that memory module as part of a first sub-tensor. The unhatched blocks 260 in FIG. 2B represent portions of tensor data interleaved onto the other memory module and stored on that memory module as part of a second sub-tensor. The arrows represent the progression of write pointers used for the location of where to write the next blocks of tensor data from the first sub-tensor and the second sub-tensor.

Unlike a CFIFO buffer that may be used to stream tensor data from the memory modules (e.g., DRAM 0 and DRAM 1) using a circular buffer, an RFIFO buffer may be configured to write an entire tensor, or a portion/slice of a tensor, from the memory modules into RAM 135 and provide portions of the tensor data from the RFIFO buffer to ML engine 105 without replacing or swapping tensor data in the RFIFO buffer with tensor data in the memory modules. Accordingly, an RFIFO buffer can be populated once with tensor data and the tensor data can be read from the RFIFO buffer multiple times. The tensor data may be written into the RFIFO buffer in a raster order received from the memory modules but can be read out of the RFIFO buffer in an arbitrary programmable raster order, which differs from a conventional first-in-first-out buffer.

In FIGS. 2A and 2B, the portions of tensor data written into the respective buffers are shown as a pair of blocks from one of the sub-tensors followed by a pair of blocks from the other sub-tensor. This organization of the buffers may be based on a difference in the size of data units operated on by ML engine 105 and the size of the interleaving granularity. For example, the size of the interleaving granularity may be 64 bytes while ML engine 105 operates on data units or atoms having 32 bytes. Accordingly, tensor data may be written to the buffers in 64-byte increments and transferred to ML engine 105 in 32-byte increments.

Figure 3:
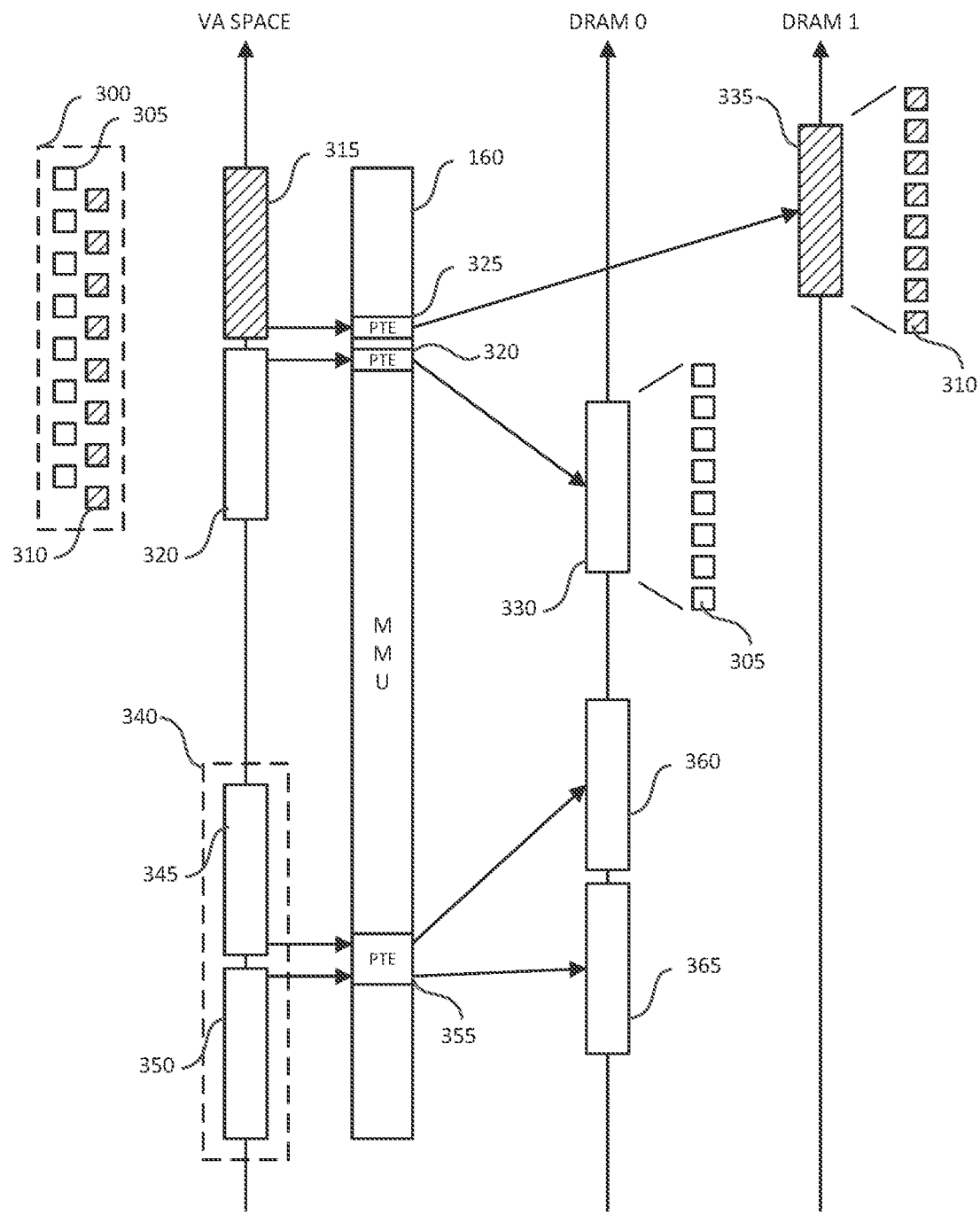
FIG. 3 is a diagram illustrating an example of a virtual-to-physical address translation for an interleaved tensor according to aspects of the subject technology.

FIG. 3 is a diagram illustrating an example of a virtual-to-physical address translation for interleaved tensor data according to aspects of the subject technology. FIG. 3 includes three vertical arrows representing the virtual address (VA) space used by DMA controller 115, the physical address space used by DRAM 0, and the physical address space used by DRAM 1. As depicted in FIG. 3, interleaved region 300 comprises interleaved portions of tensor data 305, which was interleaved onto DRAM 0, and interleaved portions of tensor data 310, which was interleaved onto DRAM 1. As an example, the virtual address for interleaved region may be a address VA[39:00].

As mentioned above, bridge circuit 125 may need to convert a virtual address received from DMA controller 115 into a physical address of DRAM 0 or DRAM 1. According to aspects of the subject technology, the virtual address received from one of the DMA channels of DMA controller 115 is processed before it is provided to MMU 160 to index into the page table. Initially, the virtual address may be de-interleaved by removing from the address value log 2(N) bits (where N is the number of memory modules onto which the tensor data was interleaved) at a matching granularity bit position. In the example above, one bit (log 2(1)) is removed from the virtual address at the 7$^{th}$ bit position from the least significant bit corresponding to the 64-byte interleaving granularity resulting in the virtual address VA[39:0] becoming VA[39:7], VA[5:0]. The de-interleaving of the virtual address creates two regions of virtual address space represented by region 315 and region 320 in FIG. 3.

The two regions of virtual address space may then be segmented into page granularities corresponding to the page granularity of the physical address space used by DRAM and DRAM 1. Page granularity may refer to a fixed-length contiguous block of memory referenced by a single entry in the page table. The regions of virtual address space are segmented by dropping a number of least significant bits from the de-interleaved virtual address corresponding to the page granularity size. For example, a 4 kilobyte page granularity size would result in dropping the 12 least significant bits from the de-interleaved virtual address resulting in VA[39:7], VA[5:0] becoming VA[39:13]. In the example illustrated in FIG. 3, regions 315 and 320 are 4 kilobytes each and therefore no further segmenting occurs at this stage of the address translation.

Finally, the segmented virtual address is incremented by a corresponding [0 . . . N−1] parity value, which indicates which memory module the tensor data is stored on. For the N=2 example used above, either a 0 or a 1 is appended as the least significant bit of the segmented virtual address based on whether the virtual address was provided for a sub-tensor stored in DRAM 0 or a sub-tensor stored in DRAM 1. For a sub-tensor stored in DRAM 0, the virtual address used by MMU 160 to index into the page table becomes MMU{VA[39:13], 0} corresponding to page table entry 320, and for a sub-tensor stored in DRAM 1, the virtual address used by MMU to index into the page table becomes MMU{VA[39:13], 1} corresponding to page table entry 325.

Page table entry 320 contains a physical address for page 330 in DRAM 0 containing the portions of tensor data 305 and may be used by bridge circuit 125 to read that page out of DRAM 0 and provide it to DMA channel 0 of the DMA controller 115. Similarly, page table entry 325 contains a physical address for page 335 in DRAM 1 containing the portions of tensor data 310 and may be used by bridge circuit 125 to read that page out of DRAM 1 and provide it to DMA channel of DMA controller 115. In this example, incrementing the segmented virtual address with either a 0 or a 1 results in successive page table entries mapping the virtual addresses to different memory modules, which may improve bandwidth spreading of the subject technology.

As further illustrated in FIG. 3, the address translation works for non-interleaved regions in the virtual address space. For example, region 340 includes page 345 and page 350 in the virtual address space. The least significant bits corresponding to the page granularity size of DRAM 0 and DRAM 1 are dropped from the virtual address and the resulting address is used to index into the page table by MMU 160. In the example above, VA[39:0] is converted to VA[39:12] and used to index into the page table to identify page table entry 355. Page table entry 355 contains a physical address for a large page containing pages 360 and 365, containing the data corresponding to pages 345 and 350 in the virtual address space, in DRAM 0.

According to aspects of the subject technology, a device is provided that includes a direct memory access (DMA) controller comprising a plurality of DMA channels, a bridge circuit configured to couple the plurality of DMA channels to a plurality of memory channels, wherein each memory channel comprises a respective memory module, and a local memory unit. The DMA controller is configured to transfer tensor data between the local memory unit and the memory modules using concurrent data transactions via the plurality of DMA channels and the plurality of memory channels, the tensor data is stored and addressed as parts of a single tensor in the local memory unit, and the tensor data is interleaved onto the memory modules and is stored and addressed as a plurality of sub-tensors in respective memory modules.

Each DMA channel may be associated with a respective sub-tensor of the plurality of sub-tensors and a respective memory channel of the plurality of memory channels. Each DMA channel may be configured to provide a virtual address for the associated sub-tensor to the associated memory channel, where the bridge circuit may be configured to convert the virtual address for the associated sub-tensor into a physical address on the memory module of the associated memory channel.

The bridge circuit may be further configured to convert the virtual address for the associated sub-tensor by de-interleaving the virtual address based on a granularity of the interleaving, segmenting the de-interleaved address based on a page granularity of the associated memory module, and indexing into a page table using the segmented address to determine the physical address. De-interleaving the virtual address may comprise removing a number of bits corresponding to a number of the DMA channels at a bit position in the virtual address corresponding to a granularity size of the interleaving. Segmenting the de-interleaved address may comprise dropping a number of least-significant bits from the de-interleaved address corresponding to the page granularity size of the associated memory module. The bridge circuit may be further configured to increment the segmented address by a parity value corresponding to the associated DMA channel before indexing into the page table. The number of DMA channels may be two, the granularity size of the interleaving may be 64 bytes, and the page granularity size of the associated memory module may be four kilobytes.

The local memory unit may include a random-access memory (RAM) comprising an internal buffer configured to store the tensor data, and a plurality of DMA buffers corresponding to the plurality of DMA channels, where the local memory unit may be configured to transfer portions of the tensor data between the internal buffer and the plurality of DMA buffers according to an interleaving pattern, and where the DMA controller may be configured to transfer data between the memory modules and the respective plurality of DMA buffers based on a fullness value of the internal buffer.

The internal buffer may be a raster first-in-first-out (RFIFO) buffer, wherein the local memory unit is configured to transfer the portions of the tensor data in any raster order. The internal buffer may be a circular first-in-first-out (CFIFO) buffer, wherein the local memory unit is configured to transfer the portions of the tensor data in an order received by the CFIFO. The local memory unit may further include a client buffer, wherein the local memory unit is further configured to transfer the tensor data between the client buffer and the internal buffer according to commands received from a client module coupled to the local memory unit.

According to aspects of the subject technology, a device is provided that includes a direct memory access (DMA) controller comprising a plurality of DMA channels, a bridge circuit configured to couple the plurality of DMA channels to a plurality of independent memory channels, wherein each memory channel comprises a respective memory module, and a local memory unit comprising an internal buffer in a random-access memory (RAM). The DMA controller is configured to transfer tensor data between the internal buffer of the local memory unit and the memory modules using concurrent data transactions via the plurality of DMA channels and the plurality of memory channels, the tensor data is stored and addressed as parts of a single tensor in the internal buffer of the local memory unit, and the tensor data is interleaved onto the memory modules and is stored and addressed as a plurality of sub-tensors on respective memory modules.

The local memory unit may further include a plurality of DMA buffers corresponding to the plurality of DMA channels, wherein the tensor data transferred between the internal buffer and the memory modules may be transferred via the plurality of DMA buffers, and wherein the local memory unit ay be configured to transfer portions of the tensor data between the internal buffer and the plurality of DMA buffers according to an interleaving pattern.

The DMA controller may be configured to transfer the tensor data between the internal buffer and the memory modules based on a fullness value of the internal buffer. The DMA controller may be configured to transfer the tensor data between the internal buffer and the memory modules based on respective fullness values of the plurality of DMA buffers.

The local memory unit may further include a buffer manager configured to modify values of a plurality of write pointers corresponding to the plurality of DMA buffers used when transferring portions of tensor data from the plurality of DMA buffers to the internal buffer, and to modify values of a plurality of read pointer corresponding to the plurality of DMA buffers when transferring portions of tensor data from the internal buffer to the plurality of DMA buffers. The internal buffer may be a raster first-in-first-out (RFIFO) buffer, wherein the local memory unit is configured to transfer the portions of the tensor data in any raster order. The internal buffer may be a circular first-in-first-out (CFIFO) buffer, wherein the local memory unit is configured to transfer the portions of the tensor data in an order received by the CFIFO.

According to aspects of the subject technology, a device is provided that includes a direct memory access (DMA) controller comprising a plurality of DMA channels, a bridge circuit configured to couple the plurality of DMA channels to a plurality of memory channels, wherein each memory channel comprises a respective memory module, a local memory unit, a machine-learning engine, and a scheduler circuit configured to program the plurality of DMA channels to transfer sub-tensors from respective memory modules to the local memory unit. The sub-tensors comprise portions of a tensor interleaved onto the memory modules, and the portions of the tensor are stored and addressed as parts of a single tensor in the local memory unit.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A device, comprising:
   a direct memory access (DMA) controller comprising a plurality of DMA channels;
   a bridge circuit configured to couple the plurality of DMA channels to a plurality of memory channels via a plurality of respective buses, wherein the plurality of memory channels are coupled to respective memory modules; and
   a local memory unit,
   wherein the DMA controller is configured to transfer tensor data between the local memory unit and the memory modules via the plurality of DMA channels and the plurality of memory channels using concurrent data transactions,
   wherein the tensor data is stored and addressed as parts of a single tensor in the local memory unit,
   wherein the tensor data is interleaved onto the memory modules dividing the tensor data into sub-tensors stored and addressed as sub-tensors in the respective memory modules, and
   wherein a granularity size of the interleaving corresponds to a burst magnitude of the respective memory modules.

2. The device of claim 1, wherein each DMA channel is associated with a respective sub-tensor of the plurality of sub-tensors and a respective memory channel of the plurality of memory channels.

3. The device of claim 2, wherein each DMA channel is configured to provide a virtual address for the associated sub-tensor to the associated memory channel, and
   wherein the bridge circuit is configured to convert the virtual address for the associated sub-tensor into a physical address on the memory module of the associated memory channel.

4. The device of claim 3, wherein the bridge circuit is further configured to convert the virtual address for the associated sub-tensor by de-interleaving the virtual address based on a granularity of the interleaving, segmenting the de-interleaved address based on a page granularity of the associated memory module, and indexing into a page table using the segmented address to determine the physical address.

5. The device of claim 4, wherein de-interleaving the virtual address comprises removing a number of bits corresponding to a number of the DMA channels at a bit position in the virtual address corresponding to the granularity size of the interleaving.

6. The device of claim 5, wherein segmenting the de-interleaved address comprises dropping a number of least-significant bits from the de-interleaved address corresponding to the page granularity size of the associated memory module.

7. The device of claim 6, wherein the bridge circuit is further configured to increment the segmented address by a parity value corresponding to the associated DMA channel before indexing into the page table.

8. The device of claim 7, wherein the number of DMA channels is two, the granularity size of the interleaving is 64 bytes, and the page granularity size of the associated memory module is four kilobytes.

9. The device of claim 1, wherein the local memory unit comprises:
   a random-access memory (RAM) comprising an internal buffer configured to store the tensor data; and
   a plurality of DMA buffers corresponding to the plurality of DMA channels,
   wherein the local memory unit is configured to transfer portions of the tensor data between the internal buffer and the plurality of DMA buffers according to an interleaving pattern, and
   wherein the DMA controller is configured to transfer data between the memory modules and the respective plurality of DMA buffers based on a fullness value of the internal buffer.

10. The device of claim 9, wherein the internal buffer is a raster first-in-first-out (RFIFO) buffer, and
    wherein the local memory unit is configured to transfer the portions of the tensor data in any raster order.

11. The device of claim 9, wherein the internal buffer is a circular first-in-first-out (CFIFO) buffer, and
    wherein the local memory unit is configured to transfer the portions of the tensor data in an order received by the CFIFO.

12. The device of claim 9, wherein the local memory unit further comprises:
    a client buffer,
    wherein the local memory unit is further configured to transfer the tensor data between the client buffer and the internal buffer according to commands received from a client module coupled to the local memory unit.

13. A device, comprising:
    a direct memory access (DMA) controller comprising a plurality of DMA channels;
    a bridge circuit configured to couple the plurality of DMA channels to a plurality of memory channels via a plurality of respective buses, wherein the plurality of memory channels are coupled to respective memory modules; and
    a local memory unit comprising an internal buffer in a random-access memory (RAM), wherein the DMA controller is configured to transfer tensor data between the internal buffer of the local memory unit and the memory modules via the plurality of DMA channels and the plurality of memory channels using concurrent data transactions, wherein the tensor data is stored and addressed as parts of a single tensor in the internal buffer of the local memory unit, wherein the tensor data is interleaved onto the memory modules dividing the tensor data into sub-tensors stored and addressed as sub-tensors on the respective memory modules, and wherein a granularity size of the interleaving corresponds to a burst magnitude of the respective memory modules.

14. The device of claim 13, wherein the local memory unit further comprises:

a plurality of DMA buffers corresponding to the plurality of DMA channels, wherein the tensor data transferred between the internal buffer and the memory modules is transferred via the plurality of DMA buffers, and wherein the local memory unit is configured to transfer portions of the tensor data between the internal buffer and the plurality of DMA buffers according to an interleaving pattern.

15. The device of claim 14, wherein the DMA controller is configured to transfer the tensor data between the internal buffer and the memory modules based on a fullness value of the internal buffer.

16. The device of claim 14, wherein the DMA controller is configured to transfer the tensor data between the internal buffer and the memory modules based on respective fullness values of the plurality of DMA buffers.

17. The device of claim 14, wherein the local memory unit further comprises:

a buffer manager configured to modify values of a plurality of write pointers corresponding to the plurality of DMA buffers used when transferring portions of tensor data from the plurality of DMA buffers to the internal buffer, and to modify values of a plurality of read pointer corresponding to the plurality of DMA buffers when transferring portions of tensor data from the internal buffer to the plurality of DMA buffers.

18. The device of claim 13, wherein the internal buffer is a raster first-in-first-out (RFIFO) buffer, and wherein the local memory unit is configured to transfer the portions of the tensor data in any raster order.

19. The device of claim 13, wherein the internal buffer is a circular first-in-first-out (CFIFO) buffer, and wherein the local memory unit is configured to transfer the portions of the tensor data in an order received by the CFIFO.

20. A device, comprising:

a direct memory access (DMA) controller comprising a plurality of DMA channels;

a bridge circuit configured to couple the plurality of DMA channels to a plurality of memory channels via a plurality of respective buses, wherein the plurality of memory channels are coupled to respective memory modules;

a local memory unit;

a machine-learning engine; and a scheduler circuit configured to program the plurality of DMA channels to transfer sub-tensors from the respective memory modules to the local memory unit, wherein the sub-tensors comprise portions of a tensor interleaved onto the memory modules, wherein the portions of the tensor are stored and addressed as parts of a single tensor in the local memory unit, and wherein a granularity size of the interleaving corresponds to a burst magnitude of the respective memory modules.

* * * * *